United States Patent
Choudhary et al.

(10) Patent No.: US 10,782,964 B2
(45) Date of Patent: Sep. 22, 2020

(54) MEASURING SIMILARITY OF SOFTWARE COMPONENTS

(71) Applicant: Red Hat, Inc., Raleigh, NC (US)

(72) Inventors: Saket Kumar Choudhary, Allahabad (IN); Manjunath Appasaheb Sindagi, Pune (IN); Mitesh Vinodbhai Patel, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/637,684

(22) Filed: Jun. 29, 2017

(65) Prior Publication Data
US 2019/0004790 A1    Jan. 3, 2019

(51) Int. Cl.
| | |
|---|---|
| *G06F 8/75* | (2018.01) |
| *G06F 8/65* | (2018.01) |
| *G06F 8/71* | (2018.01) |
| *G06F 8/36* | (2018.01) |
| *G06F 21/50* | (2013.01) |
| *G06F 21/44* | (2013.01) |
| *G06F 8/74* | (2018.01) |

(52) U.S. Cl.
CPC .......... *G06F 8/751* (2013.01); *G06F 8/65* (2013.01); *G06F 8/71* (2013.01); *G06F 8/75* (2013.01); *G06F 21/44* (2013.01); *G06F 21/50* (2013.01); *G06F 8/36* (2013.01); *G06F 8/74* (2013.01)

(58) Field of Classification Search
CPC ..... G06F 8/20; G06F 8/30; G06F 8/36; G06F 8/71; G06F 9/44505; G06F 9/44521; G06F 8/00–78
See application file for complete search history.

(56) References Cited

U.S. PATENT DOCUMENTS

| | | | |
|---|---|---|---|
| 8,032,507 B1 * | 10/2011 | Bayardo | G06F 17/3069 707/706 |
| 8,336,028 B2 * | 12/2012 | Hinton | G06F 8/74 705/7.36 |
| 8,412,648 B2 | 4/2013 | Karypis et al. | |
| 8,589,784 B1 | 11/2013 | Verstak et al. | |

(Continued)

FOREIGN PATENT DOCUMENTS

WO    WO 2015084150 A1    6/2015

OTHER PUBLICATIONS

Shirkhorshidi, Ali Seyed, Saeed Aghabozorgi, and Teh Ying Wah. "A comparison study on similarity and dissimilarity measures in clustering continuous data." PloS one 10.12 (2015). (Year: 2015).*

(Continued)

*Primary Examiner* — Geoffrey R St Leger
*Assistant Examiner* — Joanne G Macasiano
(74) *Attorney, Agent, or Firm* — Haynes and Boone, LLP

(57) ABSTRACT

Methods, systems, and computer program products are included for measuring similarity between different versions of software components. An example method includes a computing device identifying one or more software components. Properties are determined corresponding to a component of the identified one or more software components. The determined properties are represented as elements of a vector. A similarity is determined between the vector and a second vector corresponding to a different version of the component. A result is provided that indicates the determined similarity.

14 Claims, 5 Drawing Sheets

(56) References Cited

U.S. PATENT DOCUMENTS

| | | | |
|---|---|---|---|
| 8,640,119 B2 | 1/2014 | Vidal et al. | |
| 9,128,797 B2 | 9/2015 | Zheng et al. | |
| 9,378,242 B1* | 6/2016 | Fontenot | G06F 16/332 |
| 9,542,412 B2 | 1/2017 | Bates-Haus et al. | |
| 9,576,241 B2 | 2/2017 | Sweeney et al. | |
| 9,594,837 B2 | 3/2017 | Raman et al. | |
| 9,740,531 B2* | 8/2017 | LaMantia | G06F 9/5038 |
| 9,946,879 B1* | 4/2018 | Sharifi Mehr | G06F 16/381 |
| 9,949,879 B2* | 4/2018 | Schoultz | A61F 13/15747 |
| 2009/0138843 A1* | 5/2009 | Hinton | G06F 8/74 |
| | | | 717/101 |
| 2013/0055202 A1* | 2/2013 | Dudek | G06F 8/70 |
| | | | 717/120 |
| 2013/0117676 A1* | 5/2013 | De Pauw | G06F 9/45558 |
| | | | 715/738 |
| 2013/0268916 A1* | 10/2013 | Misra | G06F 8/73 |
| | | | 717/123 |
| 2014/0358810 A1 | 12/2014 | Hardtke et al. | |
| 2015/0106578 A1 | 4/2015 | Warfield et al. | |
| 2016/0148103 A1 | 5/2016 | Sarrafzadeh et al. | |
| 2016/0162690 A1* | 6/2016 | Reith | G06F 21/577 |
| | | | 726/25 |
| 2016/0378445 A1* | 12/2016 | Kashiwagi | G06F 16/245 |
| | | | 717/143 |
| 2016/0378558 A1* | 12/2016 | LaMantia | G06F 9/5038 |
| | | | 718/103 |
| 2017/0147338 A1* | 5/2017 | Jackson | G06F 11/36 |
| 2017/0221090 A1* | 8/2017 | Li | G06Q 30/0244 |
| 2017/0270432 A1* | 9/2017 | Sachdev | G06F 9/543 |
| 2017/0300691 A1* | 10/2017 | Upchurch | G06F 21/563 |
| 2017/0346839 A1* | 11/2017 | Peppe | G06F 21/577 |
| 2017/0364333 A1* | 12/2017 | Davies | G06F 8/36 |
| 2018/0089311 A1* | 3/2018 | Soni | G06F 17/30696 |
| 2018/0129812 A1* | 5/2018 | Kang | G06F 21/566 |
| 2018/0253338 A1* | 9/2018 | Barsness | G06F 8/433 |

OTHER PUBLICATIONS

Ralhan, Chavi. Software Clone Detection Using Cosine Distance Similarity. Diss. National Institute of Technology Jalandhar, 2015. (Year: 2015).*

Brysbaert, Guillaume, et al., "Quality Assessment of Transcriptome Data Using Intrinsic Statistical Properties", Genomics Proteomics Bioinformatics, vol. 8, No. 1, Mar. 2010, pp. 57-71.

David, Yaniv, et al., "Statistical Similarity of Binaries", ACM SIGPLAN Notices—PLDI 2016, vol. 51, No. 6, Jun. 2016, pp. 266-280.

* cited by examiner

MEASURING SIMILARITY OF SOFTWARE COMPONENTS

FIELD OF DISCLOSURE

The present disclosure generally relates to software package management and version control.

BACKGROUND

A conventional mechanism for file distribution includes organizing software files and resources into a software package. Software packages, files, and resources are traditionally marked with a version number to distinguish between older and newer versions of the software. For example, as further development occurs with respect to the software, new software versions are released that include additional features and/or correct earlier defects in the software. These new software versions generally include updated version numbers to distinguish from the previous software versions.

Software versioning techniques generally include incrementing the version number as newer versions are released. Versions can also be categorized as major versions and minor versions. For example, in a version x.y, the x portion can indicate the major version corresponding to the software and the y portion can indicate the minor version corresponding to the software. Accordingly, by reviewing the version numbers, users generally are able to identify the latest version of the software.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: receiving, at a server computing device, a manifest corresponding to a software of a client computing device; identifying, based on the manifest, a component of the software; determining properties corresponding to the identified component; representing the determined properties as elements of a vector corresponding to the identified component; determining a similarity between the vector and a second vector corresponding to a second version of the identified component; comparing the determined similarity to a threshold; and providing, by the server computing device, a result of the comparing to the client computing device, the result indicating whether to replace the identified component on the client computing device with the second version of the identified component. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause at least one machine to perform operations including: identifying one or more components of a software, determining properties corresponding to the identified one or more components of the software, representing the determined properties of a component of the identified one or more components as elements of a vector, determining a similarity between the vector and a second vector corresponding to a different version of the component, and providing a result indicating the determined similarity. Other examples of this aspect include corresponding computer systems, apparatus, and computer programs recorded on one or more computer storage devices, each to perform the actions of the methods.

One general aspect includes a system including: a non-transitory memory including instructions; and one or more hardware processors of a server computing device, the one or more hardware processors coupled to the non-transitory memory to read the instructions to cause the server computing device to perform operations including receiving, from a client computing device, a manifest corresponding to a software; identifying, based on the manifest, one or more software components of the software; determining properties corresponding to a software component of the identified the one or more software components; representing the determined properties as elements of a vector corresponding to the software component; determining a similarity between the vector and a second vector corresponding to a different version of the software component; comparing the determined similarity to a threshold; providing, to the client computing device, a result of the comparing that indicates whether to replace the component on the client computing device with the different version of the software component. Other examples of this aspect include corresponding computer systems, apparatus, and computer programs recorded on one or more computer storage devices, each to perform the actions of the methods.

Figure 1:
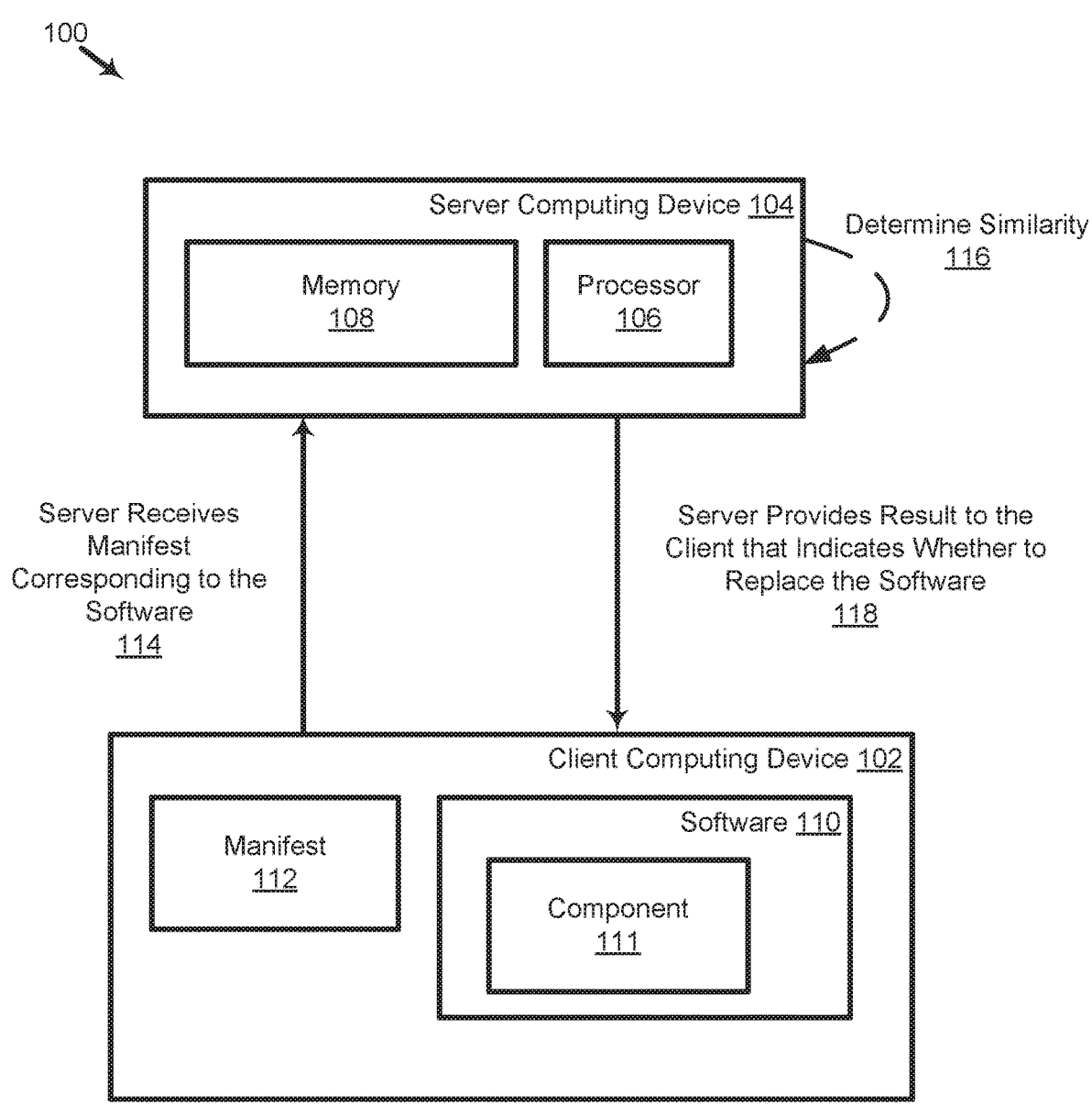
FIG. 1 is an organizational diagram illustrating a system that includes a server computing device that evaluates software components of a client computing device and provides results to the client indicating whether to replace the software components, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide techniques for measuring similarity of software components, such as packages, files and other resources. These techniques evaluate intrinsic properties of the software components, providing useful advantages over the traditional techniques of software versioning. These techniques solve problems associated with traditional software versioning techniques, as described below.

Generally, software versioning does not provide users with accurate information regarding how different each version is from the previous version. For example, a user may have a software component that is version 4.0. Version 4.1 may have been released. By comparing the version numbers, the user may generally understand that version 4.1 was released after version 4.0, but otherwise be unable to determine from the version numbers alone whether the latest version is a significant enhancement over the previous version. Accordingly, the user is unable to determine whether the latest version is worth the investment of time and computing resources to download, configure, and install. Moreover, there are instances where downgrading to a previous version is beneficial. For example, a security flaw or other defect may be identified in a latest version of software that a user has installed. A user may therefore want to determine an amount of functionality of the software component that will be lost by downgrading. If the differences are relatively minor, the user may decide to downgrade to a previous version that does not include the security flaw or other defect. As described with respect to the upgrading example, the user similarly would be unable to determine from the version numbers alone whether to downgrade the software component.

The techniques described herein provide solutions to the problems described above with respect to traditional software versioning techniques. That is, these techniques described herein provide similarity measurements regarding software components, such as between different versions of the software components, to provide users with information regarding the similarity of the software components. Further, these techniques can further provide recommendations regarding whether users should upgrade to the latest version, and provide detailed metrics of the determined similarity.

In more detail, the similarity measurements take into account intrinsic properties of the software components, such as their technical debt, code complexity, amount of functions, amount of lines of code, licensing information, and security vulnerabilities. These intrinsic properties of the software components are quantified and represented in a vector form. A modified cosine similarity method, relative similarity method, or other similarity method is then performed using the vectors corresponding to the software components. As a result of performing the similarity method(s), the similarity between the software components is quantified to provide an accurate measurement of the similarity of the software components.

Moreover, users may configure a threshold that dictates an amount of similarity to be met to cause software components to be upgraded, such that software components are automatically upgraded when new software components are released that are below the threshold. These techniques provide further advantages for improving the efficiency of computing systems, by upgrading software components when significant updates are available and conserving processing, memory, and/or network bandwidth by avoiding downloading and/or installing insignificant updates.

FIG. 1 is an organizational diagram illustrating a system 100 that includes a server that evaluates software components of a client and provides results to the client indicating whether to replace the software components, in accordance with various examples of the present disclosure.

The system 100 includes a client computing device 102 and a server computing device 104. The client and server computing devices may each include one or more computing devices such as a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single client computing device 102 and server computing device 104 are illustrated, the term "computing device" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The computing devices 102 and 104 are each structured with hardware, which includes physical elements such as one or more processors (e.g., processor 106) and one or more memory devices (e.g., memory 108). In more detail regarding the processor, the processor is structured to include one or more general-purpose processing devices such as a microprocessor, central processing unit (CPU), and the like. More particularly, the processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor is structured to include one or more special-purpose processing devices such as an application specific integrated circuit (ASIC), a field programmable gate array (FPGA), a digital signal processor (DSP), network processor, and so forth. The processor executes instructions for performing the operations, steps, and actions discussed herein.

In more detail regarding the memory, the memory is structured to include at least one computer-readable storage medium on which is stored one or more sets of instructions (e.g., software) including any one or more of the methodologies or functions described herein. The memory 108 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor.

The client computing device 102 stores software in its memory, which may include one or more software components, such as component 111. Component 111 includes a software file or other resource, or a collection of files and/or resources that are organized into a package. Generally, files include one or more executable files. Examples of resources include one or more image, audio, and/or video files that are accessed by executable files during runtime. The client computing device 102 also includes in its memory a manifest 112, which provides a description corresponding to the software 110. For example, if the software 110 includes a collection of software components, the manifest 112 may provide an identifier corresponding to each of the software components (e.g., component 111), including identifiers corresponding to the files and/or resources to indicate an identity of each file and/or resource included as part of the software components. In some examples, the manifest 112 is included as a file within the software 110, while in other examples the manifest 112 is maintained in a portion of memory that is separate from the software 110.

At action 114, the server computing device 104 receives the manifest 112 from the client computing device 102. In some examples, the receiving of the manifest 112 may be responsive to the client initiating a software change request, such as when a new version of the software 110 is detected. For example, when the new version of the software 110 is detected, a user or the client computing device 102 may request that the server computing device 104 provide an indication of the similarity between software components of the software 110 and the new version of the software. Accordingly, responsive to this request, the client computing device 102 provides the manifest 112 to the server computing device 104.

At action 116, the server computing device 104 identifies from the manifest 112 the files and/or resources corresponding to the software 110, and determines similarity between these files and/or resources and the new version of the software. The determining of the similarity may be performed, for example, as described in detail with respect to FIG. 2 in steps 202-212. While the term similarity is referred to herein, it is understood that similarity may be expressed as a difference between the versions of the software (e.g., two versions may be indicated to be 80% similar or 20% different). Accordingly, determining similarity is intended to encompass determining an amount of similarity and/or determining an amount of difference.

At action 118, the server computing device 104 provides a result to the client computing device 102 that indicates whether to replace the software 110 with the new version of the software. In some examples, the result indicates to a user and/or to the client computing device 102 the measured similarity. In other examples, the result indicates a recommendation, based on the measured similarity, regarding whether the software 110 should be upgraded. Moreover, the result may indicate that one or more components (e.g., component 111) of the software 110 should be upgraded.

Figure 2:
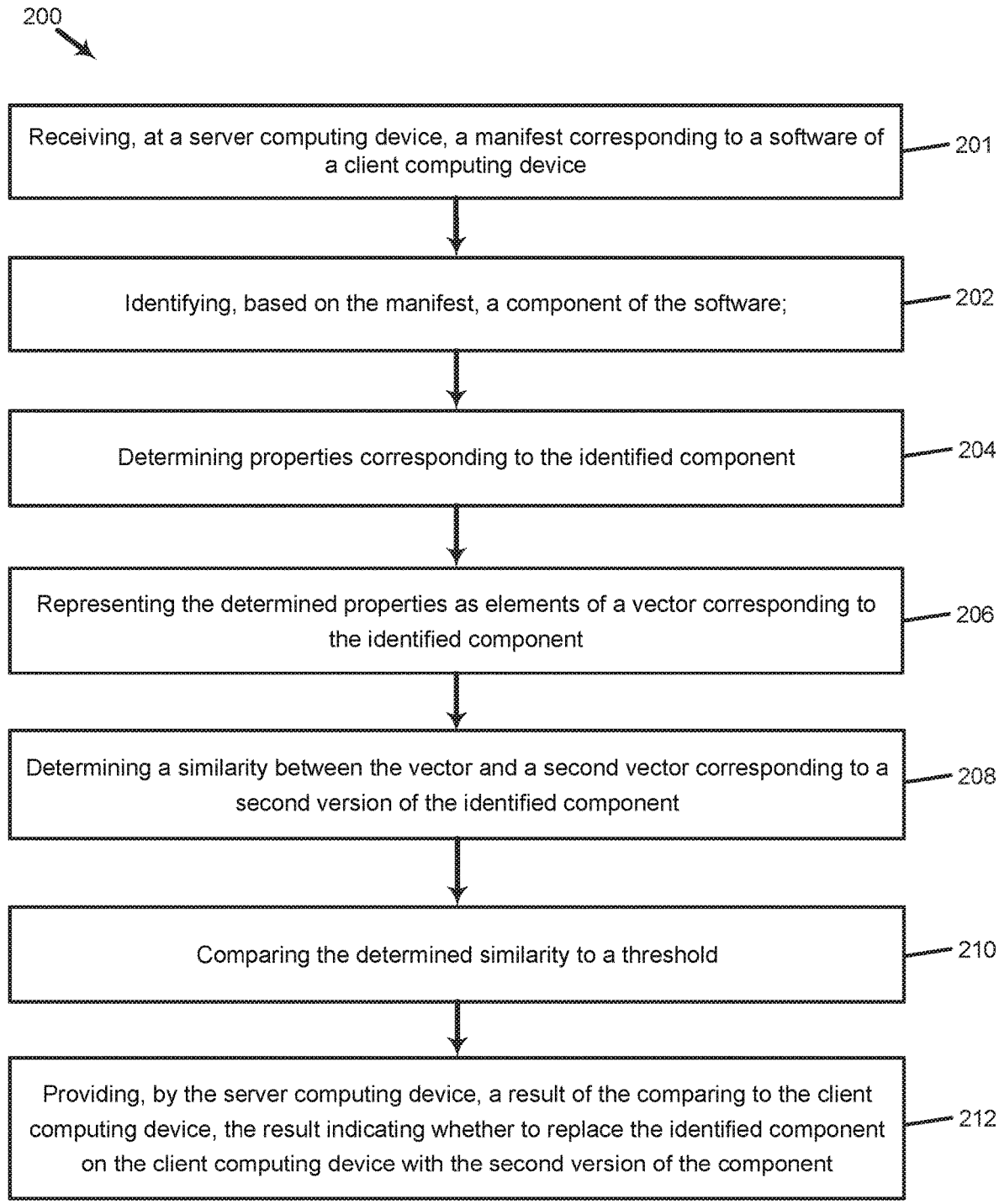
FIG. 2 is a flow diagram illustrating a method for determining similarity between software components to provide a result indicating the determined similarity, in accordance with various examples of the present disclosure.

FIG. 2 is a flow diagram of a method 200 for determining similarity between software components to provide a result indicating whether to replace a software component, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. For example, the method may be performed by the server computing device 104 that is described in further detail with respect to FIG. 1.

At action 201, a server computing device receives a manifest corresponding to a software of a client computing device. In some examples, the manifest is transmitted to the server computing device from the client computing device via one or more computer networks.

At action 202, the server computing device identifies, based on a manifest, a component (or multiple components) of the software. In the present example, the server computing device parses the manifest to read files names of the identified component and metadata information corresponding to the identified component.

At action 204, the server computing device determines properties corresponding to the identified component. Further detail regarding the properties is provided with respect to FIG. 4. In the present example, the server computing device accesses a database or other data source to obtain the properties of the identified component. For example, the server computing device may query a Common Vulnerabilities and Exposures (CVE) database to obtain security-related properties of the identified component. Similarly, other properties of the identified component, such as the amount of functions, code complexity of the components, amount of lines of code, licenses, and technical debt may be queried from one or more databases or other data sources or by using other tools. In some examples, the server computing device may parse the identified component to extract metadata included in the component and/or other information included within the files of the identified component. Accordingly, the server computing device may determine properties of the identified component by analyzing and/or parsing the files included in the component and/or by querying data sources that are external to the component.

At action 206, the server computing device represents the determined properties as elements of a vector corresponding to the identified component. Further detail regarding representing properties as elements of a vector is provided with respect to FIG. 5. In the present example, each determined property is quantified. For example, some of the properties, such as amount of lines of code, represent quantifies and are therefore readily stored as an element of the vector. Other elements, such as licensing information, may be quantified by assigning numeric values corresponding to different licenses. For example, the GNU General Public License may be assigned a value of 5. In other examples, other values may be assigned to quantify properties that are not already in numeric form. In some examples, the elements in the vector are further processed to normalize their values to a common range. For example, the elements may each be normalized to be a value in the range of between 0 and 10. In other examples, other ranges may be used.

The properties may be represented as elements of a vector in various different ways. For example, there are many different data structures that may be used to represent the properties as elements of a vector. For example, each determined property may be stored as an element of an array. In another example, the determined properties may be stored in a tuple form and/or as values in a row or column of a database table. In the present example, the properties are stored as ordered elements of a vector corresponding to the component, such as (property 1, property 2, . . . property n), where other vectors for other versions of the component are similarly represented to include the same ordering of elements. Accordingly, vectors for software components may be provided in a similar format for a point-by-point comparison of like elements.

In action 208, the server computing device determines a similarity between the vector corresponding to the identified component and a second vector corresponding to a second version of the identified component, where the second version of the component has a different version than the version of the component. In some examples, the server computing device obtains the second vector from a database or other data store, while in other examples the server computing device constructs the second vector in a similar fashion as that described with respect to the first vector. For example, the second vector may also be constructed by obtaining a manifest of the different version of the identified component, determining properties, based on the files identified in the manifest, and representing the properties as elements of the second vector.

In the present example, the server computing device determines a similarity between the vector and a second vector by performing a modified cosine similarity technique or by performing a relative similarity technique. These techniques are described in more detail with respect to FIG. 5. In other examples, a cosine similarity technique or other vector comparison technique may be performed.

In action 210, the server computing device compares the determined similarity to a threshold. The threshold may be preconfigured on the server computing device and/or preset by a user of the client computing device. For example, the result of the similarity may be provided as a percentage between 0% and 100% to indicate the similarity of the software components. As an example of the similarity threshold, a user may configure the similarity threshold to be 70% similarity, which would then be the threshold that is compared to the determined similarity.

At action 212, the server computing device provides a result of the comparing that indicates whether to replace the identified component with the second version of the identified component. In the present example, if the determined similarity is above the similarity threshold the server computing device indicates that the software component should not be replaced by the second version of the component, as the second version of the component is a relatively minor update (according to the provided threshold). In the present example, if the determined similarity is below the similarity threshold the server computing device indicates that the second version of the component should replace the component, as the second version of the component is a relatively major update (according to the provided threshold). For example, if the similarity threshold is set at 70%, if the software components are more than 70% similar then the software component will not be replaced by the latest version, and if the software components are less than 70% similar than the software component will be replaced by the later version. In other examples, the threshold may be set to be "greater than or equal to" or "less than or equal to." Similarly, the amount of similarity may instead be expressed as an amount of difference (e.g., 70% similarity corresponds to 30% difference). Moreover, automatic action, such as installing the second software component and/or installing another version of the software component may be performed based on the result of the comparing, such as when the threshold is met and/or exceeded.

In other examples, the result of the comparing may be provided by indicating the determined similarity, such that a user can make the determination to update a software version on the basis of the determined similarity without relying upon a comparison to a threshold.

Figure 3:
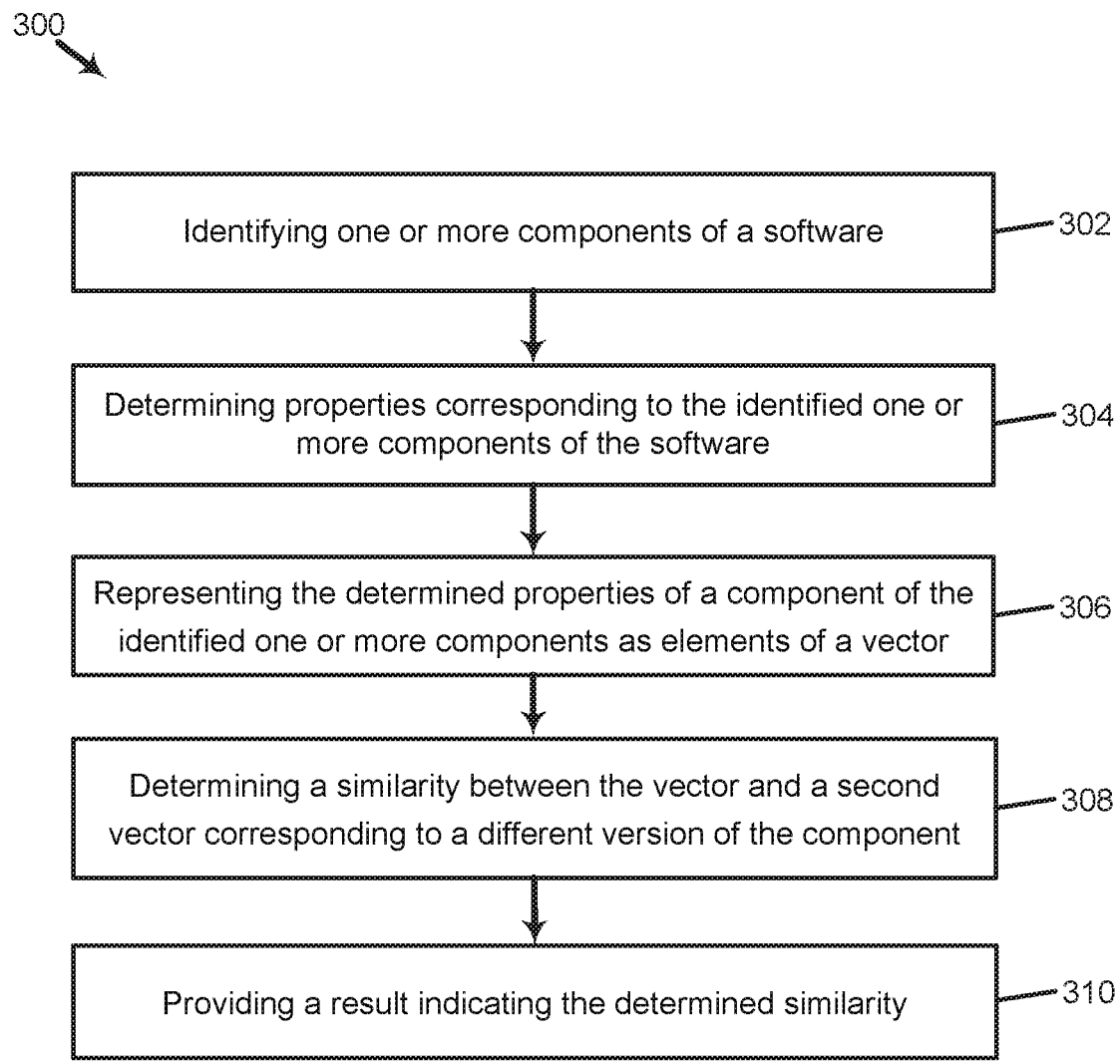
FIG. 3 is a flow diagram illustrating a method for determining similarity between software components to provide a result indicating the determined similarity, in accordance with various examples of the present disclosure.

FIG. 3 is a flow diagram of a method 300 for determining similarity between software components to provide a result indicating whether to replace a software component, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1.

At action 302, a computing device identifies one or more components of a software.

At action 304, the computing device determines properties corresponding to the identified one or more components of the software.

At action 306, the computing device represents the determined properties of at least one of the identified components as elements of a vector.

In action 308, the computing device determines a similarity between the vector corresponding to the component and a second vector corresponding to a different version of the software component. In the present example, the computing device determines a similarity between the vector and the second vector by performing a modified cosine similarity technique or by performing a relative similarity technique. These techniques are described in more detail with respect to FIG. 5. In other examples, a cosine similarity technique or other vector comparison technique may be used.

In action 310, the computing device provides a result of the comparing that indicates the determined similarity. In some examples, the result is expressed in a percentage similarity or as a percentage difference between the components.

Figure 4:
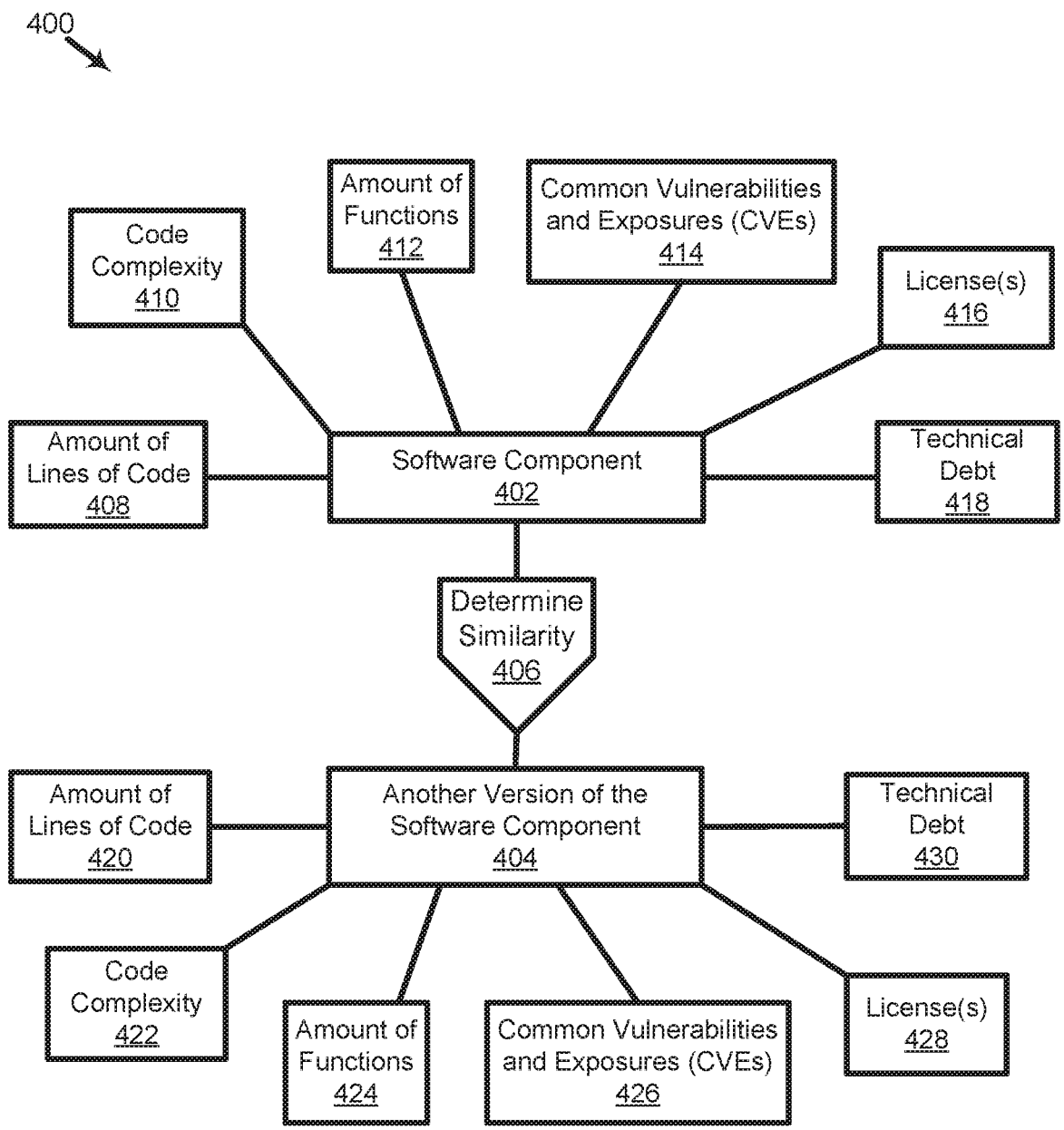
FIG. 4 is an organizational diagram illustrating properties of a software component and another version of the software component that are evaluated to determine similarity, in accordance with various examples of the present disclosure.

FIG. 4 is an organizational diagram of a system 400 including properties of a software component and another version of the software component that are evaluated to determine similarity, in accordance with various examples of the present disclosure. In some examples, the determining of the similarity between the properties is performed by one or more of the computing devices of the system 100 described with respect to FIG. 1 and by to the methods described with respect to FIG. 2, FIG. 3 and/or FIG. 5.

The software component 402 includes one or more files of a first version of a software component and another version of the software component 404 includes one or more files of a second version of the software component. A computing devices determines a similarity 406 between the software components 402 and 404 by performing a similarity method (e.g., as described with respect to FIG. 2, FIG. 3, and/or FIG. 5).

In the present example, properties of the software component 402 that are accessed for determining similarity 406 include its amount of lines of code 408, code complexity 410, amount of functions 412, common vulnerabilities and exposures (CVEs) 414, licenses 416, and technical debt 418. Similarly, in the present example, properties of the software component 404 that are accessed for determining similarity 406 include its amount of lines of code 420, code complexity 422, amount of functions 424, common vulnerabilities and exposures (CVEs) 426, licenses 428, and technical debt 430. These properties may be queried from a database and/or determined from analysis of the files themselves and their corresponding source code.

For example, the lines of code properties 408 and 420 may be determined by counting the number of lines of code in the source code files corresponding to the components.

For example, the code complexity properties 410 and 422 may be determined by counting an amount of features such as keywords and the number of nested loops in the source code files corresponding to the components. For example, the amount of functions properties 412 and 424 may be determined by counting the number of functions in the source code files corresponding to the components. For example, the CVEs properties 414 and 426 may be determined by querying a CVE database to obtain the number of known security vulnerabilities corresponding to the components. For example, the licenses properties 416 and 428 may be determined by querying a repository or parsing a file that stores information regarding which licenses are applicable to the components. For example, the technical debt properties 418 and 430 may be determined by analyzing the source code files corresponding to the components or by using other tools. The analysis of the technical debt may include analyzing features of the source code to determine a cost in time to correct issues relating to code duplication, coding violations, and lack of comments. Other metrics to measure cost in time may also be included relating to technical debt.

Other properties may be included, such as those shown below in Table 1. Moreover, as shown in Table 1, these properties may be included as elements in a vector by storing the properties as values in rows that correspond to the software components. Moreover, as shown in Table 1, the values may be normalized within a common range (e.g., 0-10).

TABLE 1

Example of Component Properties with Normalized Values Ranging Between 0 and 10.

| Software Component Version | Amount of Files | Code Complexity | Security Vulnerabilities and Exposures |
|---|---|---|---|
| Version 1.0 | 1.1 | 5.7 | 6.8 |
| Version 1.1 | 1.3 | 5.7 | 6.9 |
| Version 2.0 | 1.8 | 5.8 | 7.0 |

Figure 5:
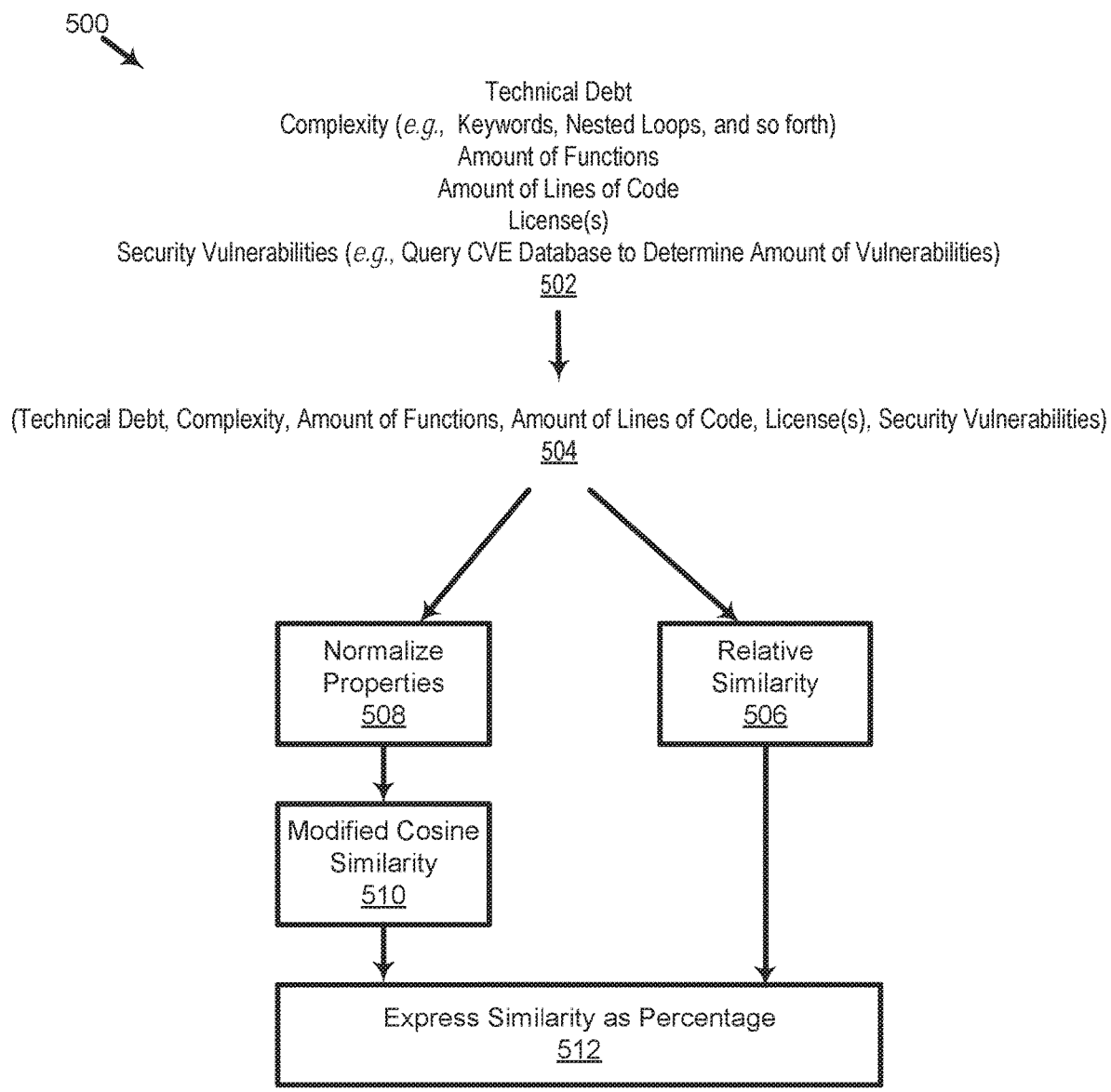
FIG. 5 is a flow diagram illustrating a method for generating a vector from properties of a software component and determining a similarity between the vector and another vector corresponding to a different version of the software component, in accordance with various examples of the present disclosure.

FIG. 5 is a flow diagram illustrating a method 500 for generating a vector from properties of a software component and determining a similarity between the vector and another vector corresponding to a different version of the software component, in accordance with various examples of the present disclosure. In some examples, the generating of the vector and determining of the similarity is performed by one or more of the computing devices of the system 100 described with respect to FIG. 1 and by one of the methods described FIG. 2 or FIG. 3, and by the properties described with respect to FIG. 4.

Element 502 shows example properties of a software component and another version of the software component. Element 504 shows an example of the properties for the software component being represented as elements of a first vector. Similarly, the properties of the other version of the software component are also represented as elements that have a same ordering in a second vector. While the properties are shown as being comma delimited elements arranged in a particular ordering, other structures may also be used. For example, the properties may be represented in as elements in a vector by including the values corresponding to the properties in an array, multi-dimensional table, linked list, or other data structure.

Once the elements are ordered in a vector format, a similarity technique, such as a relative similarity technique or a modified cosine similarity technique is performed as described with respect to actions 506 and 510 below. In some examples, the relative similarity technique is performed in instances where the properties have ordinal values. One of the advantages of the relative similarity technique is saving time and resources by avoiding normalizing raw data. In some examples, the modified cosine similarity technique is performed in instances where the properties include at least some nominal values. Normalization of the nominal values is performed prior to performing the modified cosine technique.

At action 506, a relative similarity technique is performed to compare a first vector including the properties of the software component with a second vector including properties of the second version of the software component. In the present example, the elements of the first vector (properties having the values $a_1, a_2, \ldots a_n$) and the elements of the second vector (properties having the values $b_1, b_2, \ldots b_n$) are used to determine the relative similarity according to the following process:

$$\frac{|a_1 - b_1| + |a_2 - b_2| + \ldots + |a_n - b_n|}{(a_1 + a_2 + \ldots + a_n) + (b_1 + b_2 + \ldots + b_n)}$$

Another technique for determining similarity is the modified cosine similarity technique. In the present example, before performing the modified cosine similarity technique, the values of the properties are normalized at action 508.

At action 510, after normalizing the properties, a modified cosine similarity technique is performed to compare a first vector including the properties of the software component with a second vector including properties of the other version of the software component. In the present example, the elements of the first vector (properties having the values $a_1, a_2, \ldots a_n$) and the elements of the second vector (properties having the values $b_1, b_2, \ldots b_n$) are used to determine the relative similarity according to the following process:

$$\frac{|a_1 - b_1| + |a_2 - b_2| + \ldots + |a_n - b_n|}{\sqrt{a_1^2 + a_2^2 + \ldots + a_n^2} * \sqrt{b_1^2 + b_2^2 + \ldots + b_n^2}}$$

The result of the relative similarity or modified cosine similarity process indicates a similarity that is expressed as a difference between the software component and another version of the software component. At action 512, this difference may be expressed as a percentage similarity by subtracting the result from 1, and then multiplying the result of the subtraction by 100.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
receiving, at a server computing device, a manifest corresponding to a software of a client computing device;
identifying, based on the manifest, a component of the software;
determining properties corresponding to the identified component;
representing the determined properties as elements of a vector corresponding to the identified component;
determining a similarity between the vector and a second vector corresponding to a second version of the identified component, wherein determining the similarity comprises determining:

$$\frac{|a_1 - b_1| + |a_2 - b_2| + \ldots + |a_n - b_n|}{\sqrt{a_1^2 + a_2^2 + \ldots + a_n^2} * \sqrt{b_1^2 + b_2^2 + \ldots + b_n^2}}$$

wherein $a_1, a_2, \ldots a_n$ comprise the properties that are elements of the vector, and wherein $b_1, b_2, \ldots b_n$ comprise properties that are elements of the second vector;
comparing the determined similarity to a threshold; and
providing, by the server computing device, a result of the comparing to the client computing device, the result indicating whether to replace the identified component on the client computing device with the second version of the identified component;
wherein the properties include an amount of functions property, a security vulnerability property, and a license property.

2. The method of claim 1, wherein the properties further include a technical debt property, a code complexity property, and an amount of lines of code property.

3. The method of claim 2, wherein the license property indicates one or more licenses corresponding to the software component.

4. The method of claim 2, wherein the security vulnerability property indicates an amount of security issues corresponding to the software component, and wherein the security vulnerability property is determined, at least in part, by querying a Common Vulnerabilities and Exposures (CVE) database.

5. The method of claim 2, wherein the code complexity property is determined at least in part by an amount of keywords and an amount of nested loops included in the identified component.

6. The method of claim 1, wherein determining the similarity includes normalizing the properties.

7. A non-transitory machine-readable medium having stored thereon machine-readable instructions executable to cause at least one machine to perform operations comprising:
identifying one or more components of a software;
determining properties corresponding to the identified one or more components of the software;
representing the determined properties of a component of the identified one or more components as elements of a vector;
determining a similarity between the vector and a second vector corresponding to a different version of the component, wherein determining the similarity comprises determining:

$$\frac{|a_1 - b_1| + |a_2 - b_2| + \ldots + |a_n - b_n|}{(a_1 + a_2 + \ldots + a_n) + (b_1 + b_2 + \ldots + b_n)}$$

wherein $a_1, a_2, \ldots a_n$ comprise the properties that are elements of the vector, and wherein $b_1, b_2, \ldots b_n$ comprise properties that are elements of the second vector; and
providing a result indicating the determined similarity to a client computing device, the result indicating whether to replace the identified component on the client computing device with the different version of the identified component;
wherein the properties include a code complexity property, a security vulnerability property, and a technical debt property.

8. The non-transitory machine-readable medium of claim 7, wherein the properties further include an amount of functions property and an amount of lines of code property.

9. The non-transitory machine-readable medium of claim 8, wherein the security vulnerability property indicates an amount of security issues corresponding to the component.

10. The non-transitory machine-readable medium of claim 8, wherein the complexity property is determined at least in part by an amount of keywords included in the component, and wherein the code complexity property is further determined at least in part by an amount of nested loops included in the component.

11. A system comprising:
a non-transitory memory including instructions; and
one or more hardware processors of a server computing device, the one or more hardware processors coupled to the non-transitory memory to read the instructions to cause the server computing device to perform operations comprising:
receiving, from a client computing device, a manifest corresponding to a software;
identifying, based on the manifest, one or more software components of the software;
determining properties corresponding to a software component of the identified the one or more software components;
representing the determined properties as elements of a vector corresponding to the software component;
determining a similarity between the vector and a second vector corresponding to a different version of the software component, wherein determining the similarity comprises determining:

$$\frac{|a_1 - b_1| + |a_2 - b_2| + \ldots + |a_n - b_n|}{\sqrt{a_1^2 + a_2^2 + \ldots + a_n^2} * \sqrt{b_1^2 + b_2^2 + \ldots + b_n^2}}$$

wherein $a_1, a_2, \ldots a_n$ comprise the properties that are elements of the vector, and wherein $b_1, b_2, \ldots b_n$ comprise properties that are elements of the second vector;
comparing the determined similarity to a threshold;
providing, to the client computing device, a result of the comparing that indicates whether to replace the software component on the client computing device with the different version of the software component; and wherein the properties include an amount of lines of code property, a security vulnerability property, and a license property.

12. The system of claim 11, wherein the properties include a technical debt property, a code complexity property and an amount of functions property.

13. The system of claim 12, wherein the security vulnerability property is determined at least in part by querying a Common Vulnerabilities and Exposures (CVE) database.

14. The system of claim 12, wherein the code complexity property is determined at least in part by an amount of keywords and an amount of nested loops included in the software component.

* * * * *